April 29, 1969     T. W. THOMPSON     3,441,922
GRAPHICAL TO ELECTRICAL FUNCTION TRANSLATOR
Filed Dec. 5, 1966
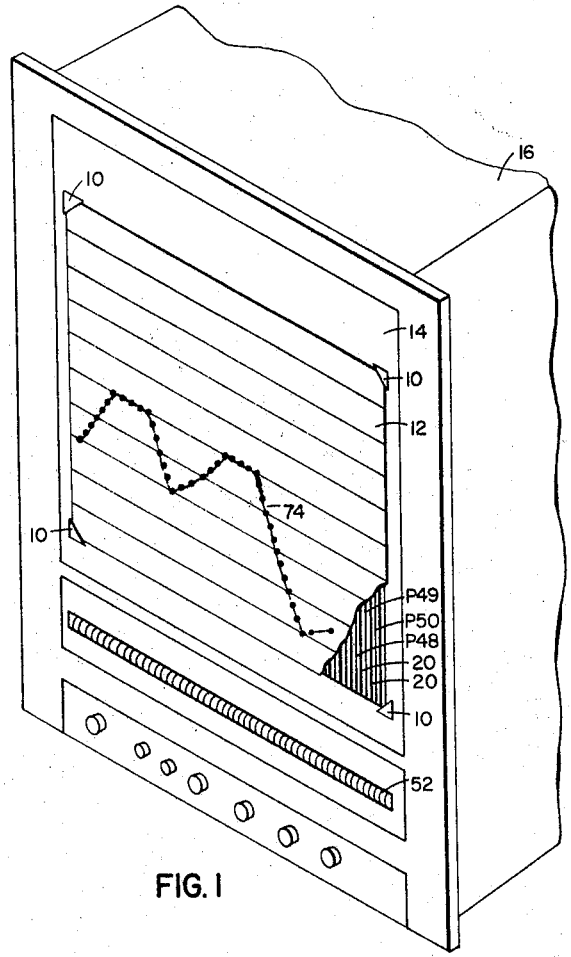
FIG. 1
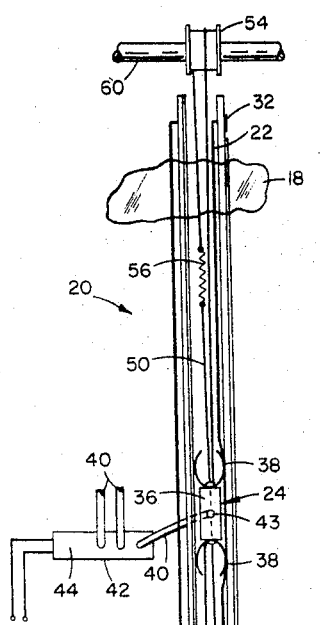
FIG. 2
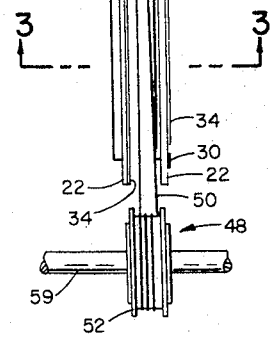
FIG. 3
Thomas W. Thompson,
INVENTOR.
BY
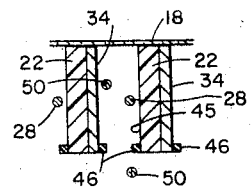
ATTORNEY Thomas W. Thompson,
INVENTOR.

3,441,922
GRAPHICAL TO ELECTRICAL FUNCTION TRANSLATOR
Thomas W. Thompson, 3836 Orleans Road, Birmingham, Ala. 35243
Filed Dec. 5, 1966, Ser. No. 599,218
Int. Cl. G08c *19/16*
U.S. Cl. 340—182     5 Claims

ABSTRACT OF THE DISCLOSURE

A device for translating a curve drawn on a sheet of light permeable paper to an electrical representation of that curve. The device employs a plurality of point output light sources which are movable on parallel tracks to be positioned to correspond with points on the curve. A potentiometer is associated with each light source to provide an output which is a function of the position of that light source. The outputs of the potentiometers are brought out to tapped positions on a scanning potentiometer which, when its movable arm is moved, provides an electrical output corresponding to the curve.

---

*Graphical to electrical function translator*

This invention relates to devices and systems for translating or generating two-dimensional functions which may be represented by a line drawing.

In accordance with the invention a curve is drawn on light permeable paper and positioned in front of a plurality of movable point light emitters. Typically the light emitters are mounted to be movable in closely spaced side-by-side tracks, as for example, vertical tracks. Means are provided to adjust or move each emitter in its tracks until the emitted light is observed to intersect a point on the curve, with the result that there is obtained a series of points along the curve. Each light emitter is position synchronized with the setting of an energized input potentiometer coupled to each light emitter. The adjustable outputs of the potentiometers are brought out to spaced tapped points on the resistance or impedance element of an output scanning potentiometer. Means are provided to cause a movable arm of the scanning potentiometer to be moved across the impedance element to create an electrical analog of the graphically presented curve. As an additional feature of the invention the movable arm is operated by a motor drive and at selected speeds and made to create selected repetitive electrical outputs or, if desired, a single electrical trace of a curve may be obtained. As still a further feature of the invention a second scanning potentiometer is ganged with the first one and a second output is obtained which is a correlated function of the position of the movement along the first scanning potentiometer as it senses outputs at different horizontal distances along the curve. In this fashion, for example, both X and Y axis information may be obtained to complete the electrical representation of a curve.

Other objects, features, and advantages of the invention will become more apparent from the following description when considered together with the drawings in which:

FIG. 1 is a pictorial view of an embodiment of the invention;

FIG. 2 is an elevational view of a light positioning-potentiometer assembly as employed in the embodiment of the invention shown in FIG. 1 and including a diagrammatic view of a light source;

FIG. 3 is an enlarged sectional view taken along the lines 3—3 of FIG. 2; and

Figure 4:
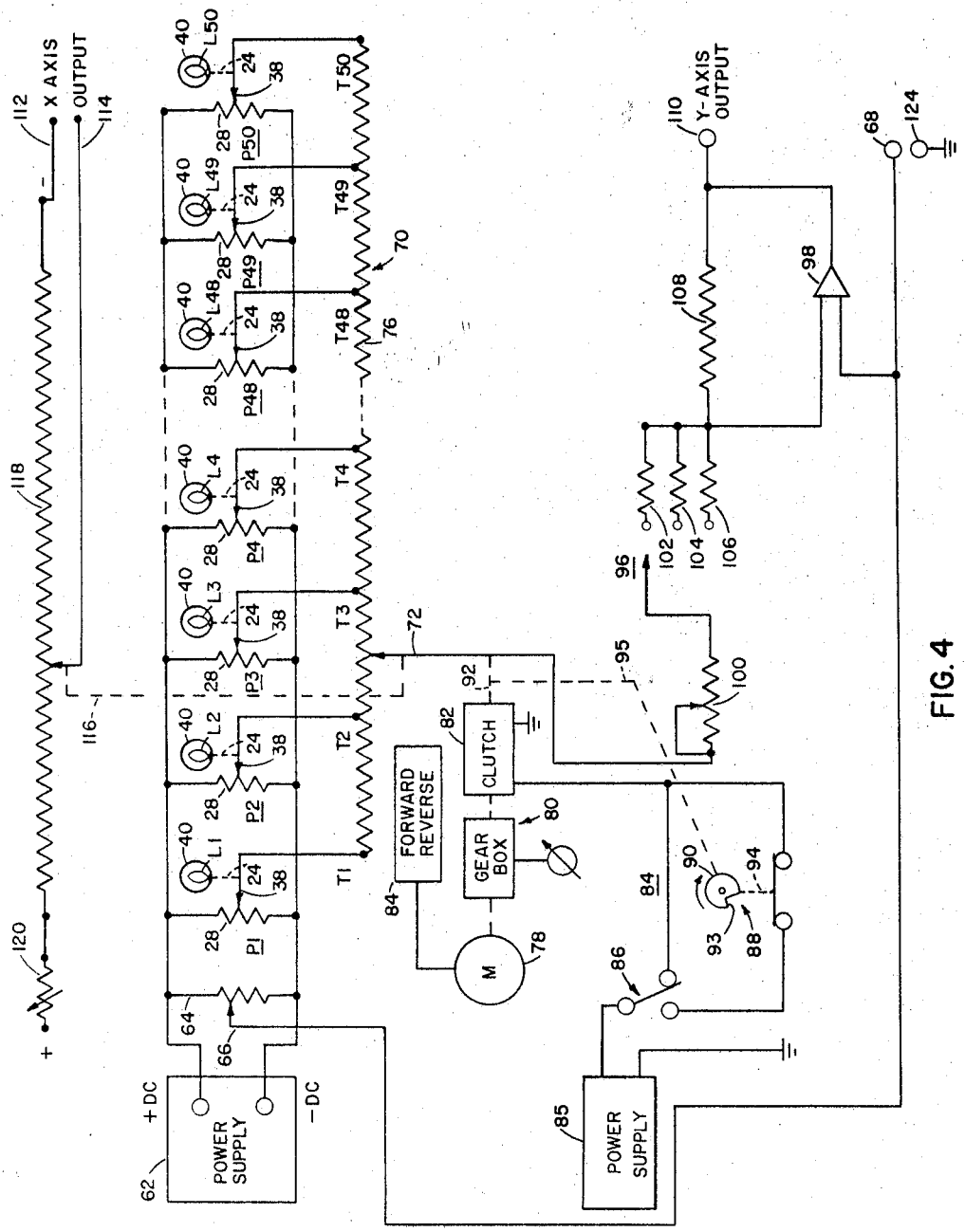
FIG. 4 is an electrical schematic diagram of the embodiment of the invention shown in FIG. 1.

Corner paper supports 10 support a sheet of light permeable paper 12 on the face side 14 of case 16 housing the electrical and mechanical elements of the system. Positioned just behind and separated from sheet 12 by glass 18 (FIG. 2), either clear or translucent, are a plurality of vertically mounted light positioning-potentiometer assemblies 20, one of which is shown in FIG. 2. Each such assembly 20 consists basically of parallel positioned conductor support members 22, and slider assembly 24. On one side 26 of each support member 22, which is of an insulating material such as phenolic board, there is a resistance element or wire 28 extending along substantially the entire length of each support member 22 which resistance wire is supported at each end by end terminals 30 and 32. The resistance element or wire 28 has an electrical resistance in the range of one (1) to five (5) ohms. On the opposite side of support member 22 is an essentially no resistance strip or plate 34, for example, a copper strip. Support members 22 are attached by means, not shown, to case 16.

Slider assembly 24 is constructed of a central insulating block 36 of a thickness slightly smaller than the space between adjacent support members 22 and typically is on the order of 1/32 inch to 1/8 inch in thickness. At each end of block 36 are electrical spring contacts 38 which serve to electrically bridge between resistance wire 28 and copper strip 34. To each slider assembly 24 is attached and fed through from the rear to front a fiber optic 40 which receives light from light source 42 and emits the light at front point 43 of slider assembly 24. To prevent stray light from being emitted between the fiber optic connections, light source is masked off with an opaque material 44.

Slider assembly 24 is held in a track 45 formed between outer glass 18 and edge extensions 46, attached to the rear edge of support members 22. Each slider assembly is moved along track 45 by cord assembly 48 wherein cord 50 is attached at each of its opposite ends to slider assembly 24 and wound between pulleys 52 and 54. Typically, several turns are made about pulley 52 which serves as a drive which when rotated by a finger or thumb causes slider assembly 24 to be positioned to a desired position along track 45. Spring 56 serves to maintain a constant tension in cord 50 to prevent slippage on drive pulley 52. Pulleys 52 and 54 are supported and rotate on axis 58 and 60, respectively, which are in turn supported by case 16 by means not shown.

Referring now to FIG. 4, each resistance wire 28 is connected across D.C. source or supply 62, across which is also connected reference potential voltage divider or potentiometer 64, the movable and intermediate arm 66 of which is connected to reference terminal 68. Each slider assembly 24, diagrammatically illustrated in FIG. 4, interconnects and mechanically couples a fiber optic 40 to spring contacts 38 which together form a light emitter-potentiometer assembly wherein the electrical output picked off by contact 38 is a direct function of position of a light emitting fiber optic to which it is so coupled.

By the use of fifty light emitter-potentiometer assemblies P1–P50, numbered and positioned from left to right, in mounting case 16, with outputs connected to a like numbered sequence of taps T1–T50 on output or scanning potentiometer 70, excellent curve detection is obtained from the output of movable arm 72 of potentiometer 70 for a fifteen inch (15″) width, X axis, curve capacity as illustrated by the dot spacing on curve 74 on sheet 12. Smooth following of the curve is obtained by virtue of the electrical impedance presented by resistance element 76 of potentiometer 70 wherein the resistance between taps is 1,000 to 50,000 ohms. Loading of input is thus avoided for accuracy.

Movable arm 72 is driven across, or in most cares around, potentiometer 70, as potentiometer 70 is usually constructed circular with taps 1–50 being thus adjacent as the beginning and end, respectively of the potentiometer. Movable arm 72 is thus driven in a circular path by motor 78 through speed adjustable gear box 80 and magnetically or electrically controlled clutch 82. Forward and reverse control is provided by motor forward-reverse control 84. Magnetic clutch 82 engages or disengages rotary drive to movable arm 72 through mode switching assembly 84 interconnecting clutch 82 with power supply 85. With switch 86 in the right, indicated, position, clutch 82 is continuously energized and engaged to continuously and repetitively provide electrical output from arm 72 corresponding to a curve determined by the settings of potentiometers P1–P50, which in turn have been set in accordance with intercept points on curve 74.

In the left or opposite position of switch 86, clutch 82 is electrically controlled through a cam switch 88 and when cam 90, driven by shaft 92 coupling clutch 82 and movable arm 72, rotates indentation 93 to a point where it pulls in cam follower 94, switch 88 opens cutting off clutch 82 and stopping shaft 92 and thus movable arm 72. The drive linkage 95 from shaft 92 to the cam 90 is alinged to open switch 88 at the point where movable arm 72 reaches the end or tap T 50 of resistance element 76. To restart arm 72, switch 86 is moved to the right position until cam 90 rotates sufficiently to cause indentation 93 to pass the point of contact withdrawal of cam follower 94 and thus until switch 88 is again closed. To limit operation to single cycle operation, switch 86 is again moved back to the left position.

The output from movable arm 72 of potentiometer 70 is fed through a variable gain resistance network 96 to the input of operational amplifier 98. By adjusting the input resistance path by means of variable resistor 100 and stepped value resistors 102, 104, or 106 the ratio of input resistance of the amplifier to the resistance of feed back resistor 108 is adjusted and a desired output voltage scale obtained as an output of the device, which output is supplied as a Y axis output between reference terminals 68 and Y axis output terminal 10.

Synchronized X axis output is obtained at X axis output terminals 112 and 114 by virtue of the ganging of movable arm 72 of potentiometer 70 with movable arm 116 of X axis scanning potentiometer 118. Scaling of the X axis output is adjusted by power supply adjusting variable resistor 120 in series between a D.C. source of power, not shown, and resistance element 122 of potentiometer 118. Terminal 124 is a chassis ground terminal for use where desired.

What is claimed and desired to be secured by Letters Patent of the United States is:

1. Graphical to electrical function translator comprising:
   (A) graphical display means for mounting a light-permeable sheet, said sheet being adapted to display a graphical line presentation;
   (B) a plurality of point light emitters;
   (C) a plurality of light positioning means, one associated with each said light emitter, and including means for positioning said light emitters along parallel lines closely adjacent each other and closely adjacent said sheet of said graphical display means;
   (D) mounting means supporting said plurality of light positioning means and comprising means for supporting said light positioning means closely spaced side by side for adjacent parallel movement of said light emitters;
   (E) a plurality of function responsive input potentiometers, one said potentiometer being associated with each of said light positioning means and each of said potentiometers having first and second end terminals and a movable intermediate terminal;
   (F) coupling means comprising means for coupling a said movable intermediate terminal of each of said potentiometers to a separate said light positioning means for varying the impedance position of a said movable intermediate terminal so coupled by movement of a said light positioning means;
   (G) power supply means for providing a first potential, a second potential and a third potential intermediate said first and second potentials;
   (H) electrical connecting means for supplying said first potential of said power supply means to said first terminal of said plurality of potentiometers and for supplying said second potential of said power supply means to said second terminal of said plurality of potentiometers;
   (I) a scanning potentiometer comprising a length of electrical resistance material, a plurality of spaced fixed terminals attached to said electrical resistance material along its length and a movable terminal adapted to be moved along in electrical contact with said length of electrical resistance material;
   (J) a plurality of electrical connections, one said connection connecting one said movable intermediate terminal of one of said input potentiometers to one of said spaced fixed terminals of said scanning potentiometer and wherein a like order of spaced light source potentiometer combinations connect to corresponding order of said spaced fixed terminals of said scanning potentometer;
   (K) electrical output means responsive to an output appearing between said third potential terminal of said power supply means and said movable terminal of said scanning potentiometer for providing an electrical voltage output.

2. The translator set forth in claim 1 wherein:
   (A) said light positioning means comprises light emitter supporting means and including a supporting member of insulating material;
   (B) a said function responsive potentiometer comprises:
      (1) a straight, elongated resistance member with a said first terminal at one end and a said second terminal at the opposite end,
      (2) an electrical contact included as a portion of said intermediate terminal and said contact being positioned and adapted to make continuous frictional contact with said elongated resistance member;
   (C) said coupling means comprises means for mounting said intermediate terminal on said supporting member of said light positioning means.

3. The translator set forth in claim 2 further comprising means for selectively moving said movable terminal of said scanning potentiometer along said length of electrical resistance material in selected directions and at selected speeds.

4. The translator set forth in claim 3 further comprising:
   (A) a scanning position function potentiometer having a resistance element, first and second end terminals and an intermediate movable terminal;
   (B) means for applying a selected potential across said last named resistance element; and
   (C) linking means coupling movement of said movable terminal of said scanning potentiometer to said intermediate movable terminal of said scanning position function potentiometer.

5. The translator set forth in claim 4 wherein said plurality of point light emitters comprises a source of light and a plurality of fiber optics, each of which is positioned to receive light from said source of light at one of a fiber optic and to emit light at the opposite end and wherein a difference said opposite end of a fiber optic is connected to a different said light positioning means.

(References on following page)

References Cited

UNITED STATES PATENTS

| | | | |
|---|---|---|---|
| 2,681,509 | 6/1954 | Elkins | 33—121 |
| 2,785,468 | 3/1957 | Elkins | 33—121 |
| 3,253,273 | 5/1966 | Allen et al. | |

JOHN W. CALDWELL, *Primary Examiner.*

A. KASPER, *Assistant Examiner.*

U.S. Cl. X.R.

33—1, 123; 235—61.6, 197; 340—177, 347